United States Patent
Tsuru et al.

(10) Patent No.: US 10,811,991 B2
(45) Date of Patent: Oct. 20, 2020

(54) HIGH FREQUENCY RECTIFIER

(71) Applicant: Mitsubishi Electric Corporation, Tokyo (JP)

(72) Inventors: Masaomi Tsuru, Tokyo (JP); Eiji Taniguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/301,556

(22) PCT Filed: Jun. 13, 2016

(86) PCT No.: PCT/JP2016/067522
§ 371 (c)(1),
(2) Date: Nov. 14, 2018

(87) PCT Pub. No.: WO2017/216839
PCT Pub. Date: Dec. 21, 2017

(65) Prior Publication Data
US 2019/0288609 A1    Sep. 19, 2019

(51) Int. Cl.
*H02J 50/20* (2016.01)
*H02J 50/27* (2016.01)
(Continued)

(52) U.S. Cl.
CPC ............ *H02M 7/08* (2013.01); *H02J 50/20* (2016.02); *H02J 50/27* (2016.02); *H01Q 1/248* (2013.01); *H02M 1/12* (2013.01)

(58) Field of Classification Search
CPC .......... H02M 7/02; H02M 7/04; H02M 7/06; H02M 7/064; H02M 7/103; H02J 50/20; H02J 50/27; H01Q 1/248
See application file for complete search history.

(56) References Cited

U.S. PATENT DOCUMENTS

| 5,671,132 A * | 9/1997 | Scapellati | ............. | H02M 3/337 |
| | | | | 323/911 |
| 8,797,771 B1 * | 8/2014 | Lee | ....................... | H02M 7/103 |
| | | | | 323/267 |

(Continued)

FOREIGN PATENT DOCUMENTS

| JP | 59-48110 U | 3/1984 |
| JP | 61-156905 A | 7/1986 |

(Continued)

OTHER PUBLICATIONS

Chaoyun Song et al., "A High-Efficiency Broadband Rectenna for Ambient Wireless Energy Harvesting", IEEE Transactions on Antennas and Propagation, vol. 63, No. 8, Aug. 1, 2015, pp. 3486-3495.

(Continued)

*Primary Examiner* — Gary L Laxton
(74) *Attorney, Agent, or Firm* — Birch, Stewart, Kolasch & Birch, LLP.

(57) ABSTRACT

A high voltage rectifier includes: a power divider (2) dividing power of high-frequency wave RF to be rectified; a capacitor (3) cutting-off direct current flowing between the power divider (2) and a first rectifier (10): and a capacitor (4) cutting-off direct current flowing between the power divider (2) and a second rectifier (20). The first rectifier (10) generates a direct-current voltage $DC_1$ by rectifying a high-frequency wave $RF_1$ output from the power divider (2), and outputs the direct-current voltage $DC_1$ to one end of a load (7). The second rectifier (20) generates a direct-current voltage $DC_2$ having a different polarity from that of the direct-current voltage $DC_1$ by rectifying high-frequency wave $RF_2$ output from the power divider (2), and outputs the direct-current voltage $DC_2$ to the other end of the load (7).

4 Claims, 5 Drawing Sheets (51) Int. Cl.
    *H02M 7/08*     (2006.01)
    *H02M 1/12*     (2006.01)
    *H01Q 1/24*     (2006.01)

(56) References Cited

U.S. PATENT DOCUMENTS

2011/0062790 A1* 3/2011 Kouki ............... H01Q 1/248
                                                                                         307/104
2016/0359378 A1* 12/2016 Kuhn ................ H02M 1/126

FOREIGN PATENT DOCUMENTS

| JP | 2000-278887 A | 10/2000 |
| --- | --- | --- |
| JP | 2012-23857 A | 2/2012 |
| JP | 2014-23069 A | 2/2014 |
| JP | 2014-45565 A | 3/2014 |

OTHER PUBLICATIONS

Extended European Search Report issued in corresponding European Application No. 16905394.9 on Apr. 18, 2019.

Olgun U. et al., "Investigation of Rectenna Array Configurations for Enhanced RF Power Harvesting", IEEE Angennas and Wireless Propagation Letters, IEEE, Piscataway, NJ, US, vol. 10, Jan. 1, 2011, pp. 262-265.
International Search Report (PCT/ISA/210) issued in PCT/JP2016/067522, dated Aug. 30, 2016.
"A 2.45-GHz Dual-Diode RF-to-dc Rectifier Applications", H. Takhedmit, and the Proc. of 40th Euro. Microwave Conf., Sep. 28, 2010.
"Innovation in Wearable and Flexible Antennas", the Haider Khaleel, and the WIT Press, Oct. 30, 2014.
Notification of Reason for Refusal issued in corresponding Korean Application No. 10-2018-7035372 dated Mar. 6, 2019.
Office Action dated Jul. 30, 2019 in corresponding Korean Patent Application No. 10-2018-7035372.
Office Action dated Jan. 27, 2020 in corresponding European Application No. 16 905 394.9.
Office Action dated Mar. 23, 2020 in corresponding Chinese Patent Application No. 201680086543.7.
Communication pursuant to Article 94(3) EPC dated Jul. 15, 2020 in corresponding European Application No. 16 905 394.9.
Shinohara et al. "Effects of Output Filter to RF-DC Conversion Efficiency in a Rectenna", 2014 XXXIth URSI General Assembly and Scientific Symposium (URSI GASS), IEEE, Aug. 16, 2014, pp. 1-4, XP032663737.

* cited by examiner

HIGH FREQUENCY RECTIFIER

TECHNICAL FIELD

The present invention relates to a high frequency rectifier that converts a high-frequency wave into direct current.

BACKGROUND ART

Single-shunt rectifiers are known as high frequency rectifiers.

A single-shunt rectifier includes a Schottky diode that is a rectifying element having its anode terminal grounded or connected to a reference potential node, an input filter connected between a cathode terminal of the Schottky diode and a signal source or a receiving antenna, and an output filter connected between the cathode terminal of the Schottky diode and a load resistor, for example.

A high-frequency wave to be rectified is output from the signal source or the receiving antenna to the single-shunt rectifier, and is then input to the Schottky diode via the input filter.

When a high-frequency wave is input to the Schottky diode, harmonic waves are generated in the Schottky diode, because of the nonlinearity of the Schottky diode.

Of the harmonic waves generated in the Schottky diode, the even-order harmonic waves are smoothed by the capacitors in the output filter, to be converted into direct current.

In such a configuration, to convert a high-frequency wave into direct current with high efficiency, the power of a desired input wave to be rectified needs to be transmitted to the Schottky diode without being reflected, and the harmonic waves generated in the Schottky diode need to be confined so as not to be re-emitted. For this reason, the impedance of the input filter viewed from the cathode terminal of the Schottky diode and the impedance of the output filter viewed from the cathode terminal of the Schottky diode need to satisfy certain conditions.

For example, the high frequency rectifier disclosed in Patent Literature 1 listed below includes an impedance matching circuit and a harmonic filter on the input side of a diode that is a rectifying element, and an output filter on the output side of the diode.

This output filter includes a capacitor connected in parallel with a load, and a transmission line that connects the capacitor and the diode. This transmission line has a length of the ¼ wavelength at the frequency of the fundamental wave in the wave to be rectified.

The input impedance of this output filter is open-circuited for odd-order harmonic waves including the fundamental wave, and is short-circuited for even-order harmonic waves. Because of this, the high-frequency voltage applied to the diode becomes close to rectangular waves, and theoretically becomes a full-wave rectified waveform. Accordingly, the RF-DC conversion efficiency, which is the efficiency of conversion from a high-frequency wave to direct current, becomes 100%.

CITATION LIST

Patent Literature

Patent Literature 1: JP 2014-23069 A

SUMMARY OF INVENTION

Technical Problem

Since a conventional high frequency rectifier is configured as described above, high-efficiency RF-DC conversion can be performed. However, if the input power of a high-frequency wave becomes high, and the voltage applied to the diode as the rectifying element reaches a breakdown voltage, current flows in the reverse direction. As a result, the RF-DC conversion efficiency becomes lower, and, in the worst case, the diode may break down.

When a plurality of diodes is connected in series in the same direction, the voltage applied to the diodes does not easily reach a breakdown voltage. However, due to the influence of parasitic components such as inductance generated between the diodes, the voltage applied to the diodes might be unbalanced. As a result, an abnormality appears in the voltage and current characteristics of the diodes so that the RF-DC conversion efficiency becomes lower. In the worst case, the diodes may break down.

The present invention has been made to solve the above problems, and an object of the present invention is to provide a high frequency rectifier capable of achieving high-efficiency RF-DC conversion even when the input power of a wave to be rectified is high.

Solution to Problem

A high frequency rectifier according to the present invention includes: a power divider performing power division of a to-be-rectified wave, and outputting a first to-be-rectified wave and a second to-be-rectified wave as to-be-rectified waves after the power division; a first rectifier generating a first direct-current voltage by rectifying the first to-be-rectified wave output from the power divider, and outputting the first direct-current voltage to one end of a load; a second rectifier generating a second direct-current voltage by rectifying the second to-be-rectified wave output from the power divider, and outputting the second direct-current voltage to another end of the load, the second direct-current voltage having a different polarity from a polarity of the first direct-current voltage; a first direct-current cut-off unit cutting-off direct current flowing between the power divider and the first rectifier; and a second direct-current cut-off unit cutting-off direct current flowing between the power divider and the second rectifier. The first rectifier includes a first rectifying element whose anode is grounded and whose cathode is connected to the first direct-current cut-off unit and said one end of the load. The second rectifier includes a second rectifying element whose cathode is grounded and whose anode is connected to the second direct-current cut-off unit and said another end of the load.

Advantageous Effects of Invention

According to the present invention, a high frequency rectifier includes: a power divider performing power division of a to-be-rectified wave; a first direct-current cut-off unit cutting-off direct current flowing between the power divider and a first rectifier; and a second direct-current cut-off unit cutting-off direct current flowing between the power divider and a second rectifier. A first rectifier generates a first direct-current voltage by rectifying a first to-be-rectified wave output from the power divider, and outputs the first direct-current voltage to one end of a load. A second rectifier generates a second direct-current voltage by rectifying a second to-be-rectified wave output from the power divider, and outputs the second direct-current voltage to another end of the load, the second direct-current voltage having a different polarity from a polarity of the first direct-current voltage. Thus, high-efficiency RF-DC conversion can be performed even when the input power of a to-be-rectified wave is high.

DESCRIPTION OF EMBODIMENTS

To explain the present invention in more detail, some embodiments for carrying out the invention are described below with reference to the accompanying drawings.

First Embodiment

Figure 1:
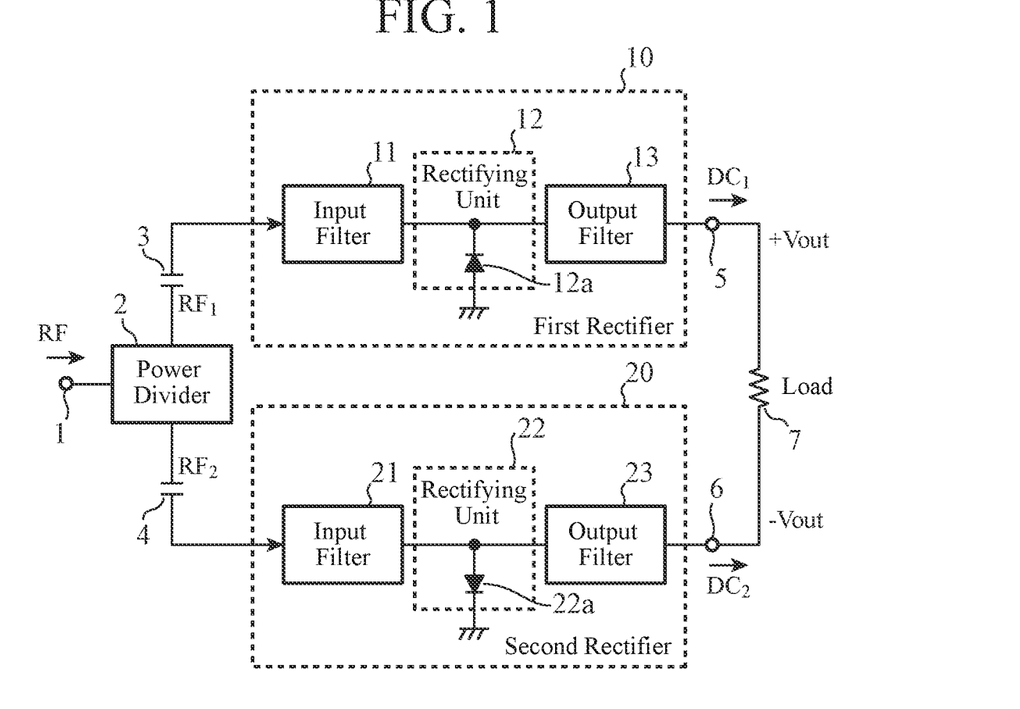
FIG. 1 is a configuration diagram showing a high frequency rectifier according to a first embodiment of the present invention.

FIG. 1 is a configuration diagram showing a high frequency rectifier according to a first embodiment of the present invention.

In FIG. 1, an input terminal 1 is a terminal to which a high-frequency wave RF to be rectified is input.

A power divider 2 divides the power of the high-frequency wave RF input from the input terminal 1, and outputs a high-frequency wave $RF_1$ (a first to-be-rectified wave) and a high-frequency wave $RF_2$ (a second to-be-rectified wave) as the high-frequency waves RF after the power division.

In the first embodiment, it is assumed that the power divider 2 divides the power of the high-frequency wave RF input from the input terminal 1 in half. However, the electric power may be divided at any appropriate division ratio by the power divider 2.

Further, in the first embodiment, an in-phase divider is used as the power divider 2, and it is assumed that the phases of the high-frequency wave $RF_1$ and the high-frequency wave $RF_2$ output from the power divider 2 are the same.

A capacitor 3 is a first direct-current cut-off unit that cuts-off direct current flowing between the power divider 2 and a first rectifier 10.

A capacitor 4 is a second direct-current cut-off unit that cuts-off direct current flowing between the power divider 2 and a second rectifier 20.

Although the first and second direct-current cut-off units are the capacitors 3 and 4 in this example, any other configurations can be adopted as long as direct current flowing between the power divider 2 and each of the first and second rectifiers 10 and 20 can be cut-off. For example, as the first and second direct-current cut-off units, coupled lines or the like that allow passage of high-frequency waves RF but prevent passage of direct current may be used.

The first rectifier 10 includes an input filter 11, a rectifying unit 12, and an output filter 13. The first rectifier 10 generates a direct-current voltage $DC_1$ (a first direct-current voltage) by rectifying the high-frequency wave $RF_1$ output from the power divider 2, and outputs the direct-current voltage $DC_1$ to an output terminal 5.

The second rectifier 20 includes an input filter 21, a rectifying unit 22, and an output filter 23. The second rectifier 20 generates a direct-current voltage $DC_2$ (a second direct-current voltage) having a different polarity from that of the direct-current voltage $DC_1$ by rectifying the high-frequency wave $RF_2$ output from the power divider 2, and outputs the direct-current voltage $DC_2$ to an output terminal 6.

The output terminal 5 is provided for outputting the direct-current voltage $DC_1$ output from the first rectifier 10 to one end of a load 7.

The output terminal 6 is provided for outputting the direct-current voltage $DC_2$ output from the second rectifier 20 to the other end of the load 7.

The input filter 11 performs impedance matching between the capacitor 3 and the rectifying unit 12, and cuts-off propagation of harmonic waves generated in the rectifying unit 12 to the capacitor 3.

The rectifying unit 12 includes a diode 12a. The rectifying unit 12 generates the direct-current voltage $DC_1$ by rectifying the high-frequency wave $RF_1$ that has passed through the input filter 11, and outputs the direct-current voltage $DC_1$ to the output filter 13.

The diode 12a is a first rectifying element that has an anode terminal (the positive terminal) grounded, and a cathode terminal (the negative terminal) connected to the output side of the input filter 11 and the input side of the output filter 13. Namely, the cathode terminal of the diode 12a is connected to the capacitor 3 via the input filter 11, and is also connected to one end of the load 7 via the output filter 13.

The output filter 13 cuts-off propagation of the high-frequency wave RF input from the input terminal 1 and the harmonic waves generated in the rectifying unit 12 to the load 7.

In the example described herein, the rectifying unit 12 includes the diode 12a. However, any other configurations can be adopted as long as the direct-current voltage $DC_1$ can be generated by rectifying the high-frequency wave $RF_1$. For example, instead of the diode 12a, the rectifying unit 12 may include a thyristor, a transistor, or the like.

The input filter 21 performs impedance matching between the capacitor 4 and the rectifying unit 22, and cuts-off propagation of harmonic waves generated in the rectifying unit 22 to the capacitor 4.

The rectifying unit 22 includes a diode 22a. The rectifying unit 22 generates the direct-current voltage $DC_2$ having a different polarity from that of the direct-current voltage $DC_1$ by rectifying the high-frequency wave $RF_2$ that has passed through the input filter 21, and outputs the direct-current voltage $DC_2$ to the output filter 23.

The diode 22a is a second rectifying element that has a cathode terminal (the negative terminal) grounded, and an anode terminal (the positive terminal) connected to the output side of the input filter 21 and the input side of the output filter 23. Namely, the anode terminal of the diode 22a is connected to the capacitor 4 via the input filter 21, and is also connected to one end of the load 7 via the output filter 23.

The output filter 23 cuts-off propagation of the high-frequency wave RF input from the input terminal 1 and the harmonic waves generated in the rectifying unit 22 to the load 7.

In the example described herein, the rectifying unit 22 includes the diode 22a. However, any other configurations can be adopted as long as the direct-current voltage $DC_2$ can be generated by rectifying the high-frequency wave $RF_2$. For example, instead of the diode 22a, the rectifying unit 22 may include a thyristor, a transistor, or the like.

Figure 2:
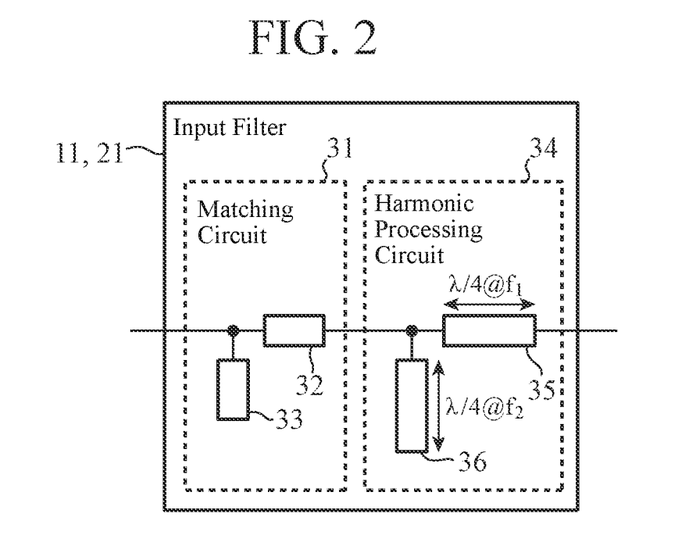
FIG. 2 is a configuration diagram showing input filters 11 and 21 included in first and second rectifiers 10 and 20.

FIG. 2 is a configuration diagram showing the input filters 11 and 21 included in the first and second rectifiers 10 and 20, respectively.

In FIG. 2, a matching circuit 31 performs impedance matching between the capacitor 3 (or 4) and the rectifying unit 12 (or 22), and includes a transmission line 32 and an open stub 33.

An end of the transmission line 32 is connected to the capacitor 3.

An end of the open stub 33 is connected to the capacitor 3.

A harmonic processing circuit 34 cuts-off propagation of harmonic waves generated in the rectifying unit 12 (or 22) to the capacitor 3 (or 4).

A transmission line 35 has one end connected to the other end of the transmission line 32, and the other end connected to the rectifying unit 12 (or 22), and has a length of the ¼ wavelength at the frequency $f_1$ of the fundamental wave of the high-frequency wave RF input from the input terminal 1. In FIG. 2, the length of the ¼ wavelength at the frequency $f_1$ of the fundamental wave is expressed as "$\lambda/4@f_1$".

An open stub 36 has one end connected to the other end of the transmission line 32, and has a length of the ¼ wavelength at the frequency $f_2$ of the second-order harmonic waves of the high-frequency wave RF input from the input terminal 1. In FIG. 2, the length of the ¼ wavelength at the frequency $f_2$ of the second-order harmonic waves is expressed as "$\lambda/4@f_2$".

Figure 3:
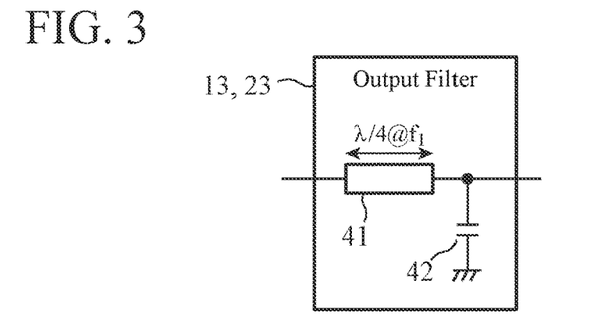
FIG. 3 is a configuration diagram showing output filters 13 and 23 included in the first and second rectifiers 10 and 20.

FIG. 3 is a configuration diagram showing the output filters 13 and 23 included in the first and second rectifiers 10 and 20, respectively.

In FIG. 3, a transmission line 41 has one end connected to the rectifying unit 12 (or 22), and the other end connected to the output terminal 5 (or 6), and has a length of the ¼ wavelength at the frequency $f_1$ of the fundamental wave of the high-frequency wave RF input from the input terminal 1. In FIG. 3, the length of the ¼ wavelength at the frequency $f_1$ of the fundamental wave is expressed as "$\lambda/4@f_1$".

A capacitor 42 has one end connected to the other end of the transmission line 41, and the other end grounded, so that the high-frequency wave RF input from the input terminal 1 and the harmonic waves generated in the rectifying unit 12 (or 22) are short-circuited.

Figure 4:
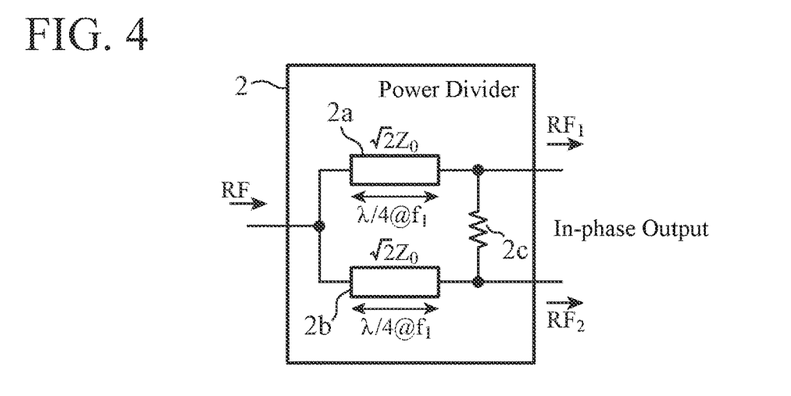
FIG. 4 is a configuration diagram showing a power divider 2 of the high frequency rectifier according to the first embodiment of the present invention.

FIG. 4 is a configuration diagram showing the power divider 2 of the high frequency rectifier according to the first embodiment of the present invention.

In FIG. 4, a transmission line 2a has one end connected to the input terminal 1 and the other end connected to the capacitor 3. The transmission line 2a has a length of the ¼ wavelength at the frequency $f_1$ of the fundamental wave of the high-frequency wave RF input from the input terminal 1, and has an impedance of $\sqrt{2} \times Z_0$. In FIG. 4, the length of the ¼ wavelength at the frequency $f_1$ of the fundamental wave is expressed as "$\lambda/4@f_1$".

A transmission line 2b has one end connected to the input terminal 1 and the other end connected to the capacitor 4. The transmission line 2b has a length of the ¼ wavelength at the frequency $f_1$ of the fundamental wave of the high-frequency wave RF input from the input terminal 1, and has an impedance of $\sqrt{2} \times Z_0$.

One end of a resistor 2c is connected to the other end of the transmission line 2a, and the other end thereof is connected to the other end of the transmission line 2b.

Next, the operation is described.

The power divider 2 divides the power of a high-frequency waves RF input from the input terminal 1 in half, and outputs the high-frequency wave $RF_1$ and the high-frequency wave $RF_2$ as the high-frequency waves RF after power division.

The high-frequency wave $RF_1$ output from the power divider 2 is input to the first rectifier 10 via the capacitor 3, and the high-frequency wave $RF_2$ output from the power divider 2 is input to the second rectifier 20 via the capacitor 4.

Since the powers of the high-frequency wave $RF_1$ and the high-frequency wave $RF_2$ input to the first and second rectifiers 10 and 20 are obtained by the power divider 2 dividing the power of the high-frequency wave RF input from the input terminal 1 in half, each of the powers of the high-frequency wave $RF_1$ and the high-frequency wave $RF_2$ is ½ of the power of the high-frequency wave RF. Because of this, each of the voltages applied to the diodes 12a and 22a is less likely to become a breakdown voltage than in a case where the high-frequency wave RF input from the input terminal 1 is directly applied to a diode.

The high-frequency wave $RF_1$ input to the first rectifier 10 is propagated to the rectifying unit 12 via the input filter 11.

In the diode 12a of the rectifying unit 12, the conduction state between the anode terminal and the cathode terminal is switched in accordance with the input high-frequency wave $RF_1$.

Specifically, in the diode 12a, during a period in which the polarity of the high-frequency wave $RF_1$ being an alternating current is negative, the conduction state between the anode terminal and the cathode terminal of the diode 12a is switched to an on-state in a case where the voltage of the high-frequency wave $RF_1$ exceeds a threshold voltage of the diode 12a, and to an off-state in a case where the voltage of the high-frequency wave $RF_1$ does not exceed the threshold voltage.

Further, during a period in which the polarity of the high-frequency wave $RF_1$ is positive, the conduction state between the anode terminal and the cathode terminal of the diode 12a is switched to an off-state.

In a case where the conduction state of the diode 12a is an on-state, that is, where the anode terminal and the cathode terminal are conducted to each other, a forward current flows through the diode 12a, and the voltage between the anode terminal and the cathode terminal becomes low.

In a case where the conduction state of the diode 12a is an off-state, that is, where the anode terminal and the cathode terminal are not conducted to each other, a reverse current does not flow in the diode 12a, and the voltage between the anode terminal and the cathode terminal becomes high.

Therefore, the voltage between the anode terminal and the cathode terminal in the diode 12a is offset by a reverse inter-terminal voltage when being temporally averaged, and is rectified through smoothing performed by the output filter 13.

Consequently, the direct-current voltage $DC_1$ output from the output filter 13 is output to one end of the load 7 via the output terminal 5.

As the anode terminal of the diode 12a is grounded, and the high-frequency wave $RF_1$ that has passed through the input filter 11 is supplied to the cathode terminal, the reverse inter-terminal voltage becomes a positive potential. Accordingly, the direct-current voltage $DC_1$ output from the output terminal 5 is a positive potential +Vout.

The high-frequency wave $RF_2$ input to the second rectifier 20 is propagated to the rectifying unit 22 via the input filter 21.

In the diode 22a of the rectifying unit 22, the conduction state between the anode terminal and the cathode terminal is switched in accordance with the input high-frequency wave $RF_2$.

Specifically, during a period in which the polarity of the high-frequency wave $RF_2$ is positive, the conduction state between the anode terminal and the cathode terminal of the diode 22a is switched to an on-state in a case where the voltage of the high-frequency wave $RF_2$ exceeds a threshold voltage of the diode 22a, and to an off-state in a case where the voltage of the high-frequency wave $RF_2$ does not exceed the threshold voltage.

During a period in which the polarity of the high-frequency wave $RF_2$ is negative, the conduction state between the anode terminal and the cathode terminal of the diode 22a is switched to an off-state.

In a case where the conduction state of the diode 22a is an on-state, that is, where the anode terminal and the cathode terminal are conducted to each other, a forward current flows through the diode 22a, and the voltage between the anode terminal and the cathode terminal becomes low.

In a case where the conduction state of the diode 22a is an off-state, that is, where the anode terminal and the cathode terminal are not conducted to each other, a reverse current does not flow in the diode 22a, and the voltage between the anode terminal and the cathode terminal becomes high.

Therefore, the voltage between the anode terminal and the cathode terminal in the diode 22a is offset by a reverse inter-terminal voltage when being temporally averaged, and is rectified through smoothing performed by the output filter 23.

Consequently, the direct-current voltage $DC_2$ output from the output filter 23 is output to the other end of the load 7 via the output terminal 6.

As the cathode terminal of the diode 22a is grounded, and the high-frequency wave $RF_2$ that has passed through the input filter 21 is supplied to the anode terminal, the reverse inter-terminal voltage becomes a negative potential. Accordingly, the direct-current voltage $DC_2$ output from the output terminal 6 becomes a negative potential −Vout.

In the above operation, since the capacitor 3 is connected to the input side of the first rectifier 10, the direct-current voltage $DC_1$ generated by the first rectifier 10 is cut off by the capacitor 3, and does not flow toward the power divider 2.

Likewise, in the above operation, since the capacitor 4 is connected to the input side of the second rectifier 20, the direct-current voltage $DC_2$ generated by the second rectifier 20 is cut off by the capacitor 4, and does not flow toward the power divider 2.

Therefore, the direct-current voltage $DC_1$ and the direct-current voltage $DC_2$, which are opposite to each other in polarity, are not short-circuited, the direct-current voltage $DC_1$ being a positive potential +Vout output from the output terminal 5 is output to one end of the load 7, and the direct-current voltage $DC_2$ being a negative potential −Vout output from the output terminal 6 is output to the other end of the load 7.

If the power of the high-frequency wave RF is equally divided by the power divider 2, and the first rectifier 10 and the second rectifier 20 have the same configuration except for the polarities of the diode 12a and the diode 22a, a direct-current voltage that is twice higher than the voltage to be supplied in a case where the number of rectifiers is one is supplied to the load 7.

That is, a high voltage being a potential difference $\Delta V$ between the direct-current voltage $DC_1$ and the direct-current voltage $DC_2$ is supplied to the load 7, as shown in the following expression (1).

$$\Delta V = DC_1 - DC_2 \qquad (1)$$
$$= +Vout - (-Vout)$$
$$= 2 \times Vout$$

As is clearly understood from the above description, a high voltage rectifier according to the first embodiment includes: the power divider 2 that performs division of power of the high-frequency wave RF to be rectified, and outputs the high-frequency wave $RF_1$ and the high-frequency wave $RF_2$ as high-frequency waves RF after the power division; the capacitor 3 that cuts-off direct current flowing between the power divider 2 and the first rectifier 10; and the capacitor 4 that cuts-off direct current flowing between the power divider 2 and the second rectifier 20. The first rectifier 10 generates the direct-current voltage $DC_1$ by rectifying the high-frequency wave $RF_1$ output from the power divider 2, and outputs the direct-current voltage $DC_1$ to one end of the load 7. The second rectifier 20 generates the direct-current voltage $DC_2$ having a different polarity from that of the direct-current voltage $DC_1$ by rectifying the high-frequency wave $RF_2$ output from the power divider 2, and outputs the direct-current voltage $DC_2$ to the other end of the load 7. Thus, high-efficiency RF-DC conversion can be performed even if the input power of the high-frequency wave RF to be rectified is high. Further, the direct-current voltage to be output to the load 7 can be made higher.

In addition to the above, according to the first embodiment, even if a parasitic inductance component is generated between the diode 12a and the diode 22a, since the diodes 12a and 22a are grounded independently, any abnormality does not appear in the voltage and current characteristics of the diodes 12a and 22a, and the diodes 12a and 22a do not break down.

Second Embodiment

Figure 5:
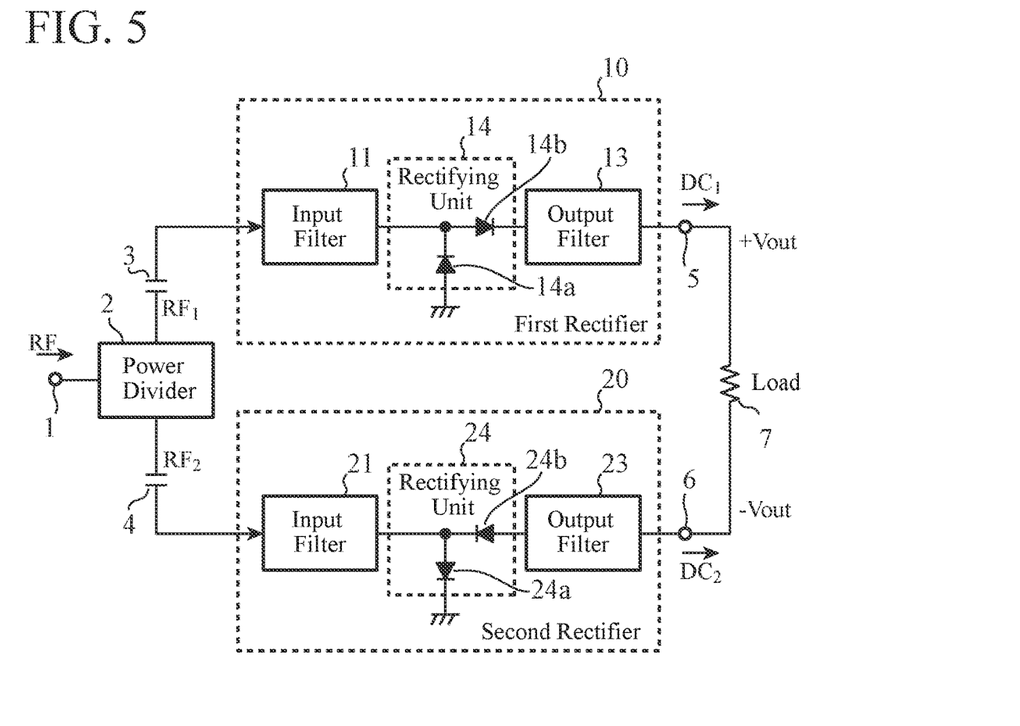
FIG. 5 is a configuration diagram showing a high frequency rectifier according to a second embodiment of the present invention.

In the first embodiment described above, the rectifying unit 12 of the first rectifier 10 includes the diode 12a, and the rectifying unit 22 of the second rectifier 20 includes the diode 22a. In the example described below in a second embodiment, on the other hand, a rectifying unit 14 of the first rectifier 10 includes two diodes 14a and 14b, and a rectifying unit 24 of the second rectifier 20 includes two diodes 24a and 24b.

FIG. 5 is a configuration diagram showing a high frequency rectifier according to the second embodiment of the present invention. In FIG. 5, the same reference numerals as those in FIG. 1 denote the same or corresponding components, and therefore, explanation of them is not made herein.

The rectifying unit 14 includes the diodes 14a and 14b. The rectifying unit 14 generates a direct-current voltage $DC_1$ by rectifying high-frequency wave $RF_1$ that has passed through an input filter 11, and outputs the direct-current voltage $DC_1$ to an output filter 13.

The diode 14a is a first rectifying element that has an anode terminal (the positive terminal) grounded, and a cathode terminal (the negative terminal) connected to the output side of the input filter 11.

The diode 14b is a second rectifying element that has an anode terminal (the positive terminal) connected to the output side of the input filter 11, and a cathode terminal (the negative terminal) connected to the input side of the output filter 13. That is, the cathode terminal of the diode 14a and the anode terminal of the diode 14b are connected to the capacitor 3 via the input filter 11, and the cathode terminal of the diode 14b is connected to one end of the load 7 via the output filter 13.

In the example described herein, the rectifying unit 14 includes the diodes 14a and 14b. However, the rectifying unit 14 may include thyristors, transistors, or the like, instead of the diodes 14a and 14b, as long as the direct-current voltage $DC_1$ can be generated by rectifying the high-frequency wave $RF_1$.

The rectifying unit 24 includes the diodes 24a and 24b. The rectifying unit 24 generates a direct-current voltage $DC_2$ having a different polarity from that of the direct-current voltage $DC_1$ by rectifying a high-frequency wave $RF_2$ that has passed through the input filter 21, and outputs the direct-current voltage $DC_2$ to the output filter 23.

The diode 24a is a third rectifying element that has a cathode terminal (the negative terminal) grounded, and an anode terminal (the positive terminal) connected to the output side of the input filter 21.

The diode 24b is a fourth rectifying element that has a cathode terminal (the negative terminal) connected to the output side of the input filter 21, and an anode terminal (the positive terminal) connected to the input side of the output filter 23. That is, the anode terminal of the diode 24a and the cathode terminal of the diode 24b are connected to the capacitor 4 via the input filter 21, and the anode terminal of the diode 24b is connected to the other end of the load 7 via the output filter 23.

In the example described herein, the rectifying unit 24 includes the diodes 24a and 24b. However, the rectifying unit 24 may include thyristors, transistors, or the like, instead of the diodes 24a and 24b, as long as the direct-current voltage $DC_2$ can be generated by rectifying the high-frequency wave $RF_2$.

In the second embodiment, the transmission line 41 in each of the output filters 13 and 23 shown in FIG. 3 is not provided.

Next, the operation is described.

The second embodiment is the same as the first embodiment described above, except for the rectifying units 14 and 24. Therefore, only the operation of each of the rectifying units 14 and 24 is described herein.

The rectifying units 14 and 24 output direct-current voltages $2 \times DC_1$ and $2 \times DC_2$ to the output terminals 5 and 6, respectively, by performing a voltage-doubling rectifying operation.

The high-frequency wave $RF_1$ input to the first rectifier 10 is propagated to the rectifying unit 14 via the input filter 11.

The diodes 14a and 14b of the rectifying unit 14 perform a voltage-doubling rectifying operation by which the conduction states of the diodes 14a and 14b are alternately switched to an on-state.

Specifically, during a period in which the polarity of the high-frequency wave $RF_1$ being an alternating current is negative, the conduction state between the anode terminal and the cathode terminal of the diode 14a is switched to an on-state in a case where the voltage of the high-frequency wave $RF_1$ exceeds the threshold voltage of the diode 14a, and to an off-state in a case where the voltage of the high-frequency wave $RF_1$ does not exceed the threshold voltage of the diode 14a.

During a period in which the polarity of the high-frequency wave $RF_1$ is positive, the conduction state between the anode terminal and the cathode terminal of the diode 14a is switched to an off-state.

On the other hand, during a period in which the polarity of the high-frequency wave $RF_1$ being an alternating current is positive, the conduction state between the anode terminal and the cathode terminal of the diode 14b is switched to an on-state in a case where the voltage of the high-frequency wave $RF_1$ exceeds the threshold voltage of the diode 14b, and to an off-state in a case where the voltage of the high-frequency wave $RF_1$ does not exceed the threshold voltage of the diode 14b.

During a period in which the polarity of the high-frequency wave $RF_1$ is negative, the conduction state between the anode terminal and the cathode terminal of the diode 14b is switched to an off-state.

In a case where each of the conduction states of the diodes 14a and 14b is an on-state, that is, where the anode terminal and the cathode terminal are conducted to each other, a forward current flows through the diodes 14a and 14b, and the voltage between the anode terminal and the cathode terminal becomes low.

In a case where each of the conduction states of the diodes 14a and 14b is an off-state, that is, where the anode terminal and the cathode terminal are not conducted to each other, a reverse current does not flow in the diodes 14a and 14b, and the voltage between the anode terminal and the cathode terminal becomes high.

Accordingly, the voltage between the anode terminal and the cathode terminal in each of the diodes 14a and 14b is offset by a reverse inter-terminal voltage when being temporally averaged. However, since at any point of time, the voltage between the anode terminal and the cathode terminal becomes high in one of the diodes 14a and 14b, the offset voltage becomes twice higher than that in the rectifying unit 12 of the first embodiment.

The output voltage of the rectifying unit 14 is rectified through smoothing performed by the output filter 13, and the direct-current voltage $2 \times DC_1$ output from the output filter 13 is output to one end of the load 7 via the output terminal 5.

As the anode terminal of the diode 14a is grounded, and the high-frequency wave $RF_1$ that has passed through the input filter 11 is supplied to the cathode terminal of the diode 14a and the anode terminal of the diode 14b, the reverse inter-terminal voltage becomes a positive potential. Accordingly, the direct-current voltage $2 \times DC_1$ output from the output terminal 5 becomes a positive potential +Vout.

The high-frequency wave $RF_2$ input to the second rectifier 20 is propagated to the rectifying unit 24 via the input filter 21.

The diodes 24a and 24b of the rectifying unit 24 perform a voltage-doubling rectifying operation by which the conduction states of the diodes 24a and 24b are alternately switched to an on-state.

Specifically, during a period in which the polarity of the high-frequency wave $RF_2$ being an alternating current is positive, the conduction state between the anode terminal and the cathode terminal of the diode 24a is switched to an on-state in a case where the voltage of the high-frequency wave $RF_2$ exceeds the threshold voltage of the diode 24a, and to an off-state in a case where the voltage of the high-frequency wave $RF_2$ does not exceed the threshold voltage of the diode 24a.

During a period in which the polarity of the high-frequency wave $RF_2$ is negative, the conduction state between the anode terminal and the cathode terminal of the diode 24a is switched to an off-state.

On the other hand, during a period in which the polarity of the high-frequency wave $RF_2$ being an alternating current is negative, the conduction state between the anode terminal and the cathode terminal of the diode 24b is switched to an on-state in a case where the voltage of the high-frequency wave $RF_2$ exceeds the threshold voltage of the diode 24b, and to an off-state in a case where the voltage of the high-frequency wave $RF_2$ does not exceed the threshold voltage of the diode 24b.

During a period in which the polarity of the high-frequency wave $RF_2$ is positive, the conduction state between the anode terminal and the cathode terminal of the diode 24b is switched to an off-state.

In a case where each of the conduction states of the diodes 24a and 24b is an on-state, that is, where the anode terminal and the cathode terminal are conducted to each other, a forward current flows through the diodes 24a and 24b, and the voltage between the anode terminal and the cathode terminal becomes low.

In a case where each of the conduction states of the diodes 24a and 24b is an off-state, that is, where the anode terminal and the cathode terminal are not conducted to each other, a reverse current does not flow in the diodes 24a and 24b, and the voltage between the anode terminal and the cathode terminal becomes high.

Accordingly, the voltage between the anode terminal and the cathode terminal in each of the diodes 24a and 24b is offset by a reverse inter-terminal voltage when being temporally averaged. However, since at any point of time, the voltage between the anode terminal and the cathode terminal becomes high in one of the diodes 24a and 24b, the offset voltage becomes twice higher than that in the rectifying unit 22 of the first embodiment.

The output voltage of the rectifying unit 24 is rectified through smoothing performed by the output filter 23, and the direct-current voltage $2 \times DC_2$ output from the output filter 23 is output to the other end of the load 7 via the output terminal 6.

As the cathode terminal of the diode 24a is grounded, and the high-frequency wave $RF_2$ that has passed through the input filter 21 is supplied to the anode terminal of the diode 24a and the cathode terminal of the diode 24b, the reverse inter-terminal voltage becomes a negative potential. Accordingly, the direct-current voltage $2 \times DC_2$ output from the output terminal 6 becomes a negative potential −Vout.

As is clearly understood from the above description, according the second embodiment, a rectifying unit 14 includes: a diode 14a that has the anode terminal grounded, and the cathode terminal connected to the output side of the input filter 11; and the diode 14b that has the anode terminal connected to the output side of the input filter 11, and the cathode terminal connected to the input side of the output filter 13. A rectifying unit 24 includes: a diode 24a that has the cathode terminal grounded, and the anode terminal connected to the output side of the input filter 21; and a diode 24b that has the cathode terminal connected to the output side of the input filter 21, and the anode terminal connected to the input side of the output filter 23. With this configuration, high-efficiency RF-DC conversion can be performed even if the input power of the high-frequency wave RF to be rectified is high, as in the first embodiment described before. Further, the direct-current voltage output to the load 7 can be made even higher than that in the first embodiment described above.

Third Embodiment

In the examples described above in the first and second embodiments, an in-phase divider is used as the power divider 2. Alternatively, a 90-degree divider may be used as a power divider.

Figure 6:
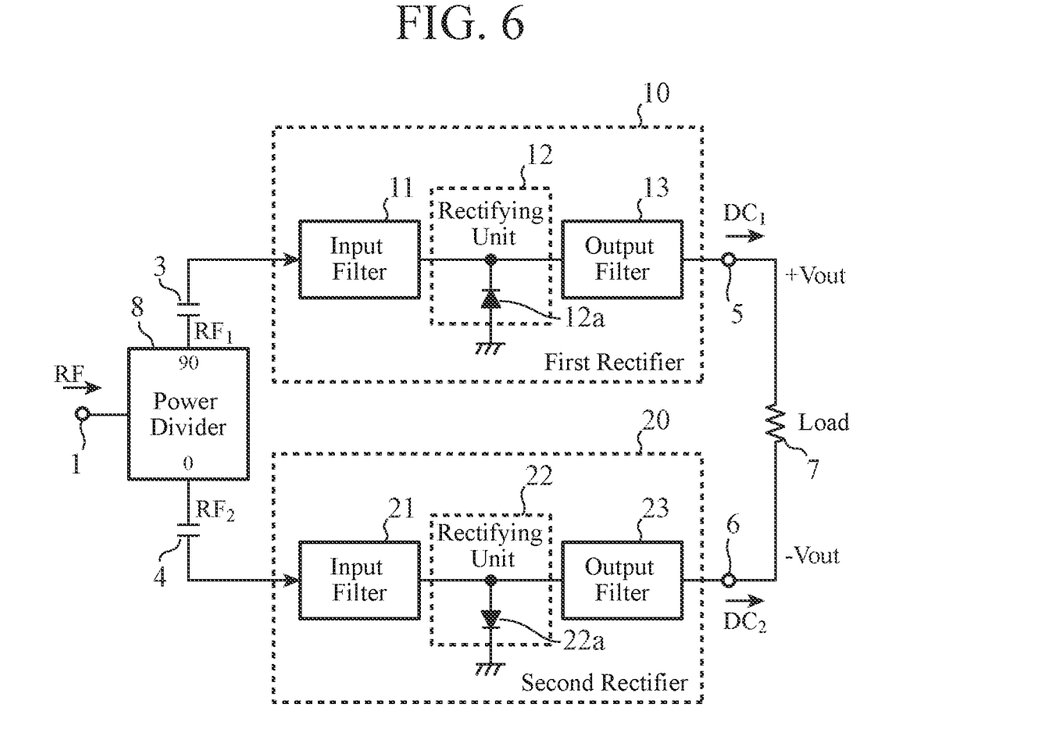
FIG. 6 is a configuration diagram showing a high frequency rectifier according to a third embodiment of the present invention.

FIG. 6 is a configuration diagram showing a high frequency rectifier according to a third embodiment of the present invention. In FIG. 6, the same reference numerals as those in FIG. 1 denote the same or corresponding components, and therefore, explanation of them is not made herein.

A power divider 8 divides the power of a high-frequency wave RF input from an input terminal 1, and outputs a high-frequency wave $RF_1$ (first to-be-rectified waves) and a high-frequency wave $RF_2$ (second to-be-rectified waves) as the high-frequency waves RF after the power division.

In the third embodiment, it is assumed that the power divider 8 divides the power of the high-frequency waves RF input from the input terminal 1 in half. However, the electric power may be divided at any appropriate division ratio in the power divider 8.

Further, in the third embodiment, a 90-degree divider is used as the power divider 8, and it is assumed that the phase difference between the high-frequency wave $RF_1$ and the high-frequency wave $RF_2$ output from the power divider 8 is 90 degrees.

The high frequency rectifier in FIG. 6 is an example in which the power divider 8 is provided in place of the power divider 2 in the high frequency rectifier shown in FIG. 1. Alternatively, the power divider 8 may be provided in place of the power divider 2 in the high frequency rectifier shown in FIG. 5.

Figure 7:
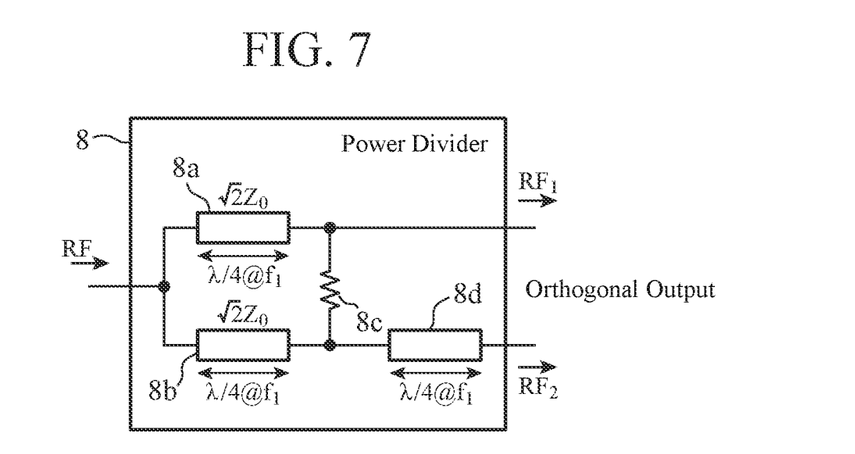
FIG. 7 is a configuration diagram showing a power divider 8 of the high frequency rectifier according to the third embodiment of the present invention.

FIG. 7 is a configuration diagram showing the power divider 8 of the high frequency rectifier according to the third embodiment of the present invention.

In FIG. 7, a transmission line 8a has one end connected to the input terminal 1, and the other end connected to a capacitor 3. The transmission line 8a has a length of the ¼ wavelength at the frequency $f_1$ of the fundamental wave of the high-frequency wave RF input from the input terminal 1, and has an impedance of $\sqrt{2} \times Z_0$. In FIG. 7, the length of the ¼ wavelength at the frequency $f_1$ of the fundamental wave is expressed as "$\lambda/4@f_1$".

A transmission line 8b has one end connected to the input terminal 1. The transmission line 8b has a length of the ¼ wavelength at the frequency $f_1$ of the fundamental wave of the high-frequency wave RF input from the input terminal 1, and has an impedance of $\sqrt{2} \times Z_0$.

One end of a resistor 8c is connected to the other end of the transmission line 8a, and the other end thereof is connected to the other end of the transmission line 8b.

A transmission line 8d has one end connected to the other end of the transmission line 8b, and the other end connected to a capacitor 4. The transmission line 8d has a length of the ¼ wavelength at the frequency $f_1$ of the fundamental wave of the high-frequency wave RF input from the input terminal 1.

In the third embodiment, since a 90-degree divider is used as the power divider 8, the phase difference between the high-frequency wave $RF_1$ and the high-frequency wave $RF_2$ output from the power divider 8 is 90 degrees so that the output from the power divider 8 becomes an orthogonal output.

According to such a configuration in which a 90-degree divider is used as the power divider 8, reflection of the high-frequency wave RF input from the input terminal 1 to the power divider 8 can be reduced, so that influence on other devices (not shown in drawings) can be suppressed.

In the example described in the third embodiment, the 90-degree divider shown in FIG. 7 is used as the power divider 8. However, the 90-degree divider does not necessarily have the configuration shown in FIG. 7, and may be a 90-degree hybrid as shown in FIG. 8.

Figure 8:
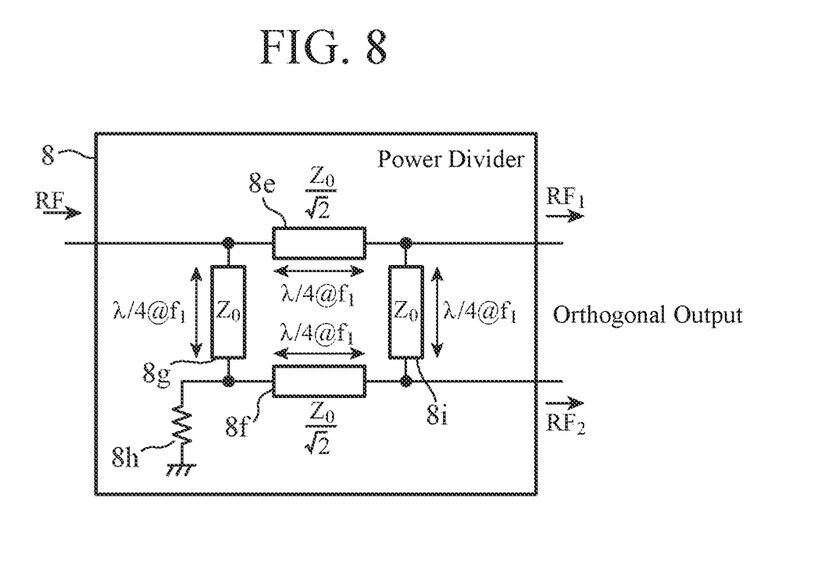
FIG. 8 is a configuration diagram showing another power divider 8 of the high frequency rectifier according to the third embodiment of the present invention.

FIG. 8 is a configuration diagram showing another power divider 8 of the high frequency rectifier according to the third embodiment of the present invention.

In FIG. 8, a transmission line 8e has one end connected to the input terminal 1, and the other end connected to the capacitor 3. The transmission line 8e has a length of the ¼ wavelength at the frequency $f_1$ of the fundamental wave in a high-frequency wave RF input from the input terminal 1, and has an impedance of $Z_0/\sqrt{2}$. In FIG. 8, the length of the ¼ wavelength at the frequency $f_1$ of the fundamental wave is expressed as "$\lambda/4@f_1$".

A transmission line 8f has one end grounded via a resistor 8h, and the other end connected to the capacitor 4. The transmission line 8f has a length of the ¼ wavelength at the frequency $f_1$ of the fundamental wave of the high-frequency wave RF input from the input terminal 1, and has an impedance of $Z_0/\sqrt{2}$.

A transmission line 8g has one end connected to the input terminal 1, and the other end grounded via the resistor 8h. The transmission line 8g has a length of the ¼ wavelength at the frequency $f_1$ of the fundamental wave of the high-frequency wave RF input from the input terminal 1, and has impedance of $Z_0$.

One end of the resistor 8h is connected to one end of the transmission line 8f and the other end of the transmission line 8g, and the other end of the resistor 8h is grounded.

A transmission line 8i has one end connected to the other end of the transmission line 8e, and the other end connected to the other end of the transmission line 8f. The transmission line 8g has a length of the ¼ wavelength at the frequency $f_1$ of the fundamental wave in a high-frequency wave RF input from the input terminal 1, and has an impedance of $Z_0$.

Fourth Embodiment

In the examples described above in the first and second embodiments, an in-phase divider is used as the power divider 2. Alternatively, a 180-degree divider may be used as a power divider.

Figure 9:
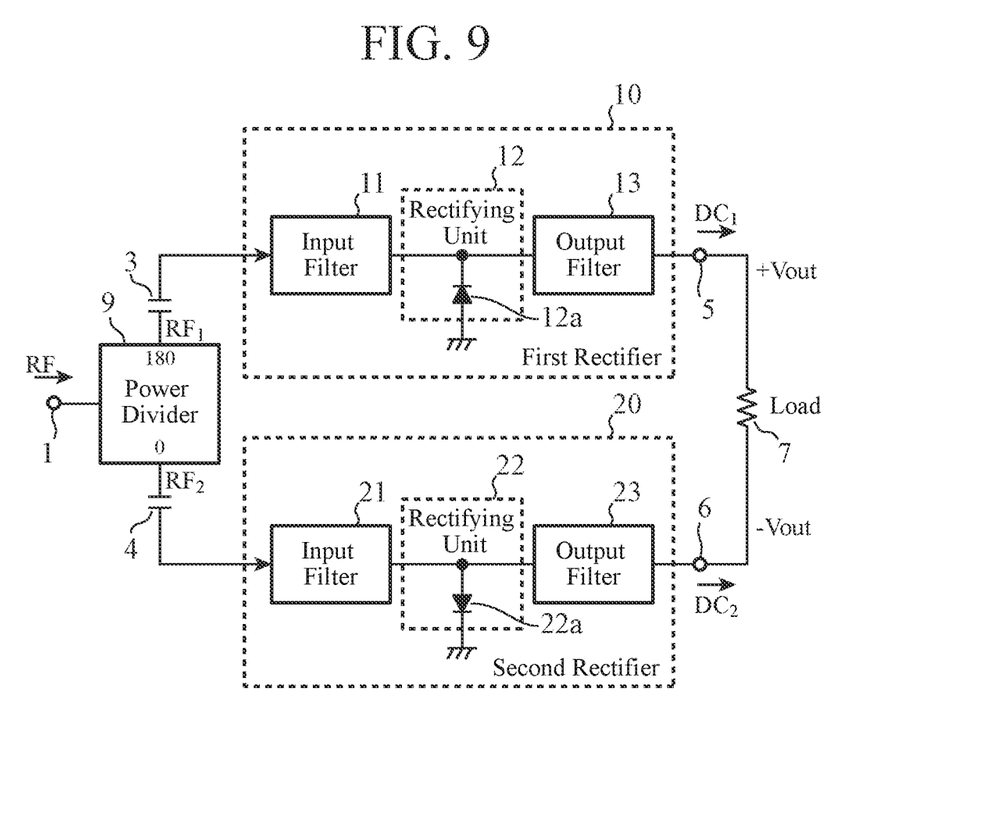
FIG. 9 is a configuration diagram showing a high frequency rectifier according to a fourth embodiment of the present invention.

FIG. 9 is a configuration diagram showing a high frequency rectifier according to a fourth embodiment of the present invention. In FIG. 9, the same reference numerals as those in FIG. 1 denote the same or corresponding components, and therefore, explanation of them is not made herein.

A power divider 9 divides the power of a high-frequency wave RF input from an input terminal 1, and outputs a high-frequency wave $RF_1$ (first to-be-rectified waves) and a high-frequency wave $RF_2$ (second to-be-rectified waves) as the high-frequency waves RF after the power division.

In the fourth embodiment, it is assumed that the power divider 9 divides the power of the high-frequency wave RF input from the input terminal 1 in half. However, the electric power may be divided at any appropriate division ratio in the power divider 9.

Further, in the fourth embodiment, a 180-degree divider is used as the power divider 9, and it is assumed that the phase difference between the high-frequency wave $RF_1$ and the high-frequency wave $RF_2$ output from the power divider 9 is 180 degrees.

The high frequency rectifier in FIG. 9 is an example in which the power divider 9 is provided in place of the power divider 2 in the high frequency rectifier shown in FIG. 1. Alternatively, the power divider 9 may be provided in place of the power divider 2 in the high frequency rectifier shown in FIG. 5.

Figure 10:
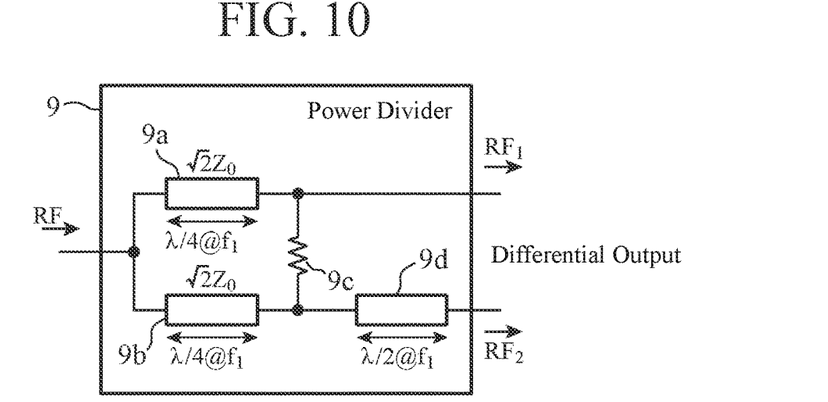
FIG. 10 is a configuration diagram showing a power divider 9 of the high frequency rectifier according to the fourth embodiment of the present invention.

FIG. 10 is a configuration diagram showing the power divider 9 of the high frequency rectifier according to the fourth embodiment of the present invention.

In FIG. 10, a transmission line 9a has one end connected to the input terminal 1, and the other end connected to the capacitor 3. The transmission line 9a has a length of the ¼ wavelength at the frequency $f_1$ of the fundamental wave of the high-frequency wave RF input from the input terminal 1, and has an impedance of $\sqrt{2} \times Z_0$. In FIG. 10, the length of the ¼ wavelength at the frequency $f_1$ of the fundamental wave is expressed as "$\lambda/4@f_1$".

A transmission line 9b has one end connected to the input terminal 1. The transmission line 9b has a length of the ¼ wavelength at the frequency $f_1$ of the fundamental wave of the high-frequency wave RF input from the input terminal 1, and has an impedance of $\sqrt{2} \times Z_0$.

One end of a resistor 9c is connected to the other end of the transmission line 9a, and the other end thereof is connected to the other end of the transmission line 9b.

A transmission line 9d has one end connected to the other end of the transmission line 9b, and the other end connected to the capacitor 4. The transmission line 9d has a length of the ½ wavelength at the frequency $f_1$ of the fundamental wave of the high-frequency wave RF input from the input terminal 1. In FIG. 10, the length of the ½ wavelength at the frequency $f_1$ of the fundamental wave is expressed as "$\lambda/2@f_1$".

In the fourth embodiment, since a 180-degree divider is used as the power divider 9, the phase difference between the high-frequency wave $RF_1$ and the high-frequency wave $RF_2$ output from the power divider 9 is 180 degrees, so that the output from the power divider 9 becomes a differential output.

According to the above configuration in which a 180-degree divider is used as the power divider 9, the ripples of the direct-current voltages $DC_1$ and $DC_2$ output to the load 7 becomes opposite in phase between the output terminal 5 and the output terminal 6, so that the ripples of the direct-current voltages $DC_1$ and $DC_2$ are canceled out. Thus, stable direct-current voltages $DC_1$ and $DC_2$ can be supplied to the load 7.

In the example described in the fourth embodiment, the 180-degree divider shown in FIG. 10 is used as the power divider 9. However, the 180-degree divider does not necessarily have the configuration shown in FIG. 10, and may have a configuration as shown in FIG. 11 or 12.

Figure 11:
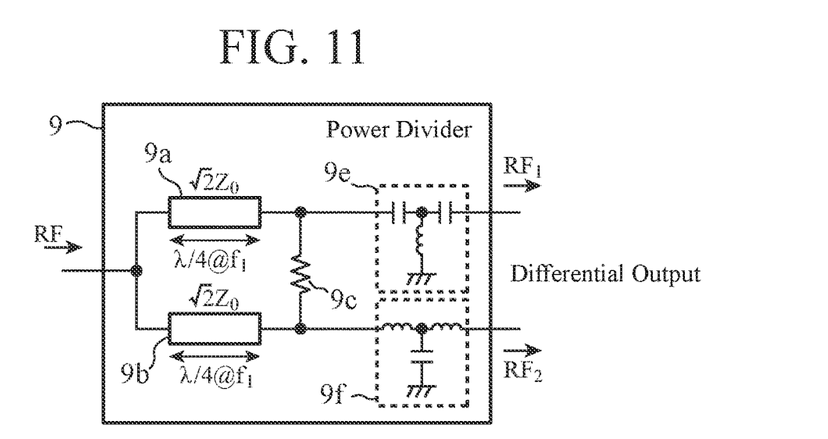
FIG. 11 is a configuration diagram showing another power divider 9 of the high frequency rectifier according to the fourth embodiment of the present invention.
Figure 12:
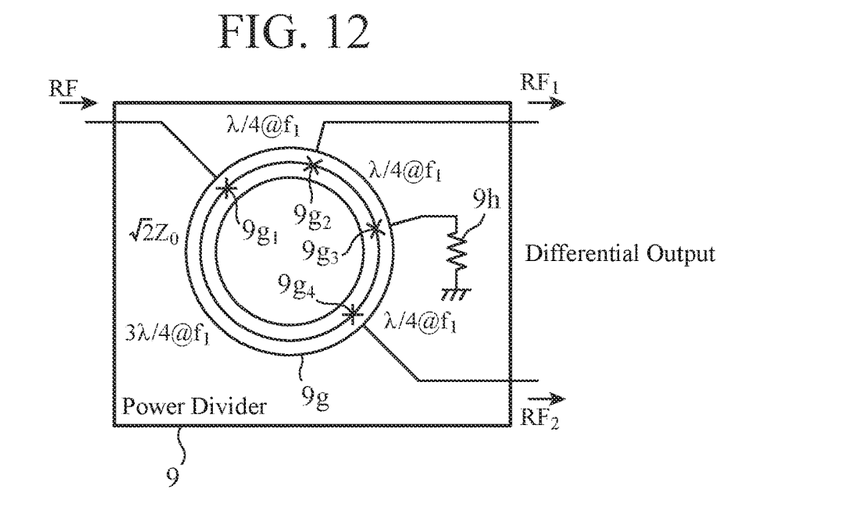
FIG. 12 is a configuration diagram showing another power divider 9 of the high frequency rectifier according to the fourth embodiment of the present invention.

FIG. 11 is a configuration diagram showing another power divider 9 of the high frequency rectifier according to the fourth embodiment of the present invention. In FIG. 11, the same reference numerals as those in FIG. 10 denote the same or corresponding components, and therefore, explanation of them is not made herein.

A high-pass filter 9e is a T-shaped filter formed by capacitors and an inductor, for example. One end of the high-pass filter 9e is connected to the other end of the transmission line 9a, and the other end thereof is connected to the capacitor 3.

A low-pass filter 9f is a T-shaped filter formed by inductors and a capacitor, for example. One end of the low-pass filter 9f is connected to the other end of the transmission line 9b, and the other end thereof is connected to the capacitor 4.

FIG. 12 is a configuration diagram showing another power divider 9 of the high frequency rectifier according to the fourth embodiment of the present invention.

In the example shown in FIG. 12, a 180-degree hybrid is used as the power divider 9 including a ring-shaped line 9g whose circumferential has a length of the 6/4 wavelength at the frequency $f_1$ of the fundamental wave.

On the ring-shaped line 9g, a connecting point $9g_2$ with the capacitor 3 is provided at a position that is the ¼ wavelength at the frequency $f_1$ of the fundamental wave away from a connecting point $9g_1$ with the input terminal 1, and a connecting point $9g_3$ with the resistor 9h is provided at a position that is the ¼ wavelength at the frequency $f_1$ of the fundamental wave away from the connecting point 9g2 with the capacitor 3.

Further, a connecting point $9g_4$ with the capacitor 4 is provided at a position that is the ¼ wavelength at the frequency $f_1$ of the fundamental wave away from the connecting point $9g_3$ with the resistor 9h.

In FIG. 12, the length of the ¼ wavelength at the frequency $f_1$ of the fundamental wave is expressed as "$\lambda/4@f_1$", and the length of the ¾ wavelength at the frequency $f_1$ of the fundamental wave is expressed as "$3\lambda/4@f_1$".

Note that, within the scope of the present invention, it is possible to make any combination of the embodiments, make any modifications to the components of any of the embodiments, or omit any component from any of the embodiments.

INDUSTRIAL APPLICABILITY

The present invention is suitable for a high frequency rectifier that converts a wave to be rectified into a direct current.

REFERENCE SIGNS LIST

1: Input terminal, 2: Power divider, 2a, 2b: Transmission line, 2c: Resistor, 3: Capacitor (first direct-current cut-off unit), 4: Capacitor (second direct-current cut-off unit), 5, 6: Output terminal, 7: Load, 8: Power divider, 8a, 8b, 8d, 8e, 8f, 8g, 8i: Transmission line, 8c, 8h: Resistor, 9: Power divider, 9a, 9b, 9d: Transmission line, 9c: Resistor, 9e: High-pass filter, 9f: Low-pass filter, 9g: Ring-shaped line, $9g_1$ to $9g_4$: Connecting point, 9h: Resistor, 10: First rectifier, 11: Input filter, 12: Rectifying unit, 12a: Diode (first rectifying element), 13: Output filter, 14a: Diode (first rectifying element), 14b: Diode (second rectifying element), 20: Second rectifier, 21: Input filter, 22: Rectifying unit, 22a: Diode (second rectifying element), 23: Output filter, 24a: Diode (third rectifying element), 24b: Diode (fourth rectifying element), 31: Matching circuit, 32: Transmission line, 33: Open stub, 34: Harmonic processing circuit, 35: Transmission line, 36: Open stub, 41: Transmission line, 42: Capacitor

The invention claimed is:

1. A high frequency rectifier comprising:
a power divider performing power division of a first to-be-rectified wave, and outputting a second to-be-rectified wave and a third to-be-rectified wave as to-be-rectified waves after the power division, the first to-be-rectified wave having a frequency;
a first rectifier generating a first direct-current voltage by rectifying the second to-be-rectified wave output from the power divider, and outputting the first direct-current voltage to one end of a load;
a second rectifier generating a second direct-current voltage by rectifying the third to-be-rectified wave output from the power divider, and outputting the second direct-current voltage to another end of the load, the second direct-current voltage having a different polarity from a polarity of the first direct-current voltage;
a first direct-current cut-off unit cutting-off direct current flowing between the power divider and the first rectifier;
a second direct-current cut-off unit cutting-off direct current flowing between the power divider and the second rectifier, wherein
the first rectifier includes a first rectifying element whose anode is grounded and whose cathode is connected to the first direct-current cut-off unit and said one end of the load,
the second rectifier includes a second rectifying element whose cathode is grounded and whose anode is connected to the second direct-current cut-off unit and said another end of the load,
a first harmonic processing circuit configured to cut-off propagation of harmonic waves generated in the first rectifying element to the first direct-current cut-off unit is provided between the first rectifying element and the first direct-current cut-off unit;
a second harmonic processing circuit configured to cut-off propagation of harmonic waves generated in the second rectifying element to the second direct-current cut-off unit is provided between the second rectifying element and the second direct-current cut-off unit;
a first output filter including a first transmission line having first and second ends and a first capacitor having first and second ends, wherein the first transmission line has the first end connected to the first rectifying element, and has a length of ¼ wavelength at the frequency of the first to-be-rectified wave, and the first capacitor has the first end connected to the second end of the first transmission line, and the second end of the capacitor is grounded, so that the second to-be-rectified wave is short-circuited; and
a second output filter including a second transmission line having first and second ends and a second capacitor having first and second ends, wherein the second transmission line has the first end connected to the second rectifying element, and has a length of ¼ wavelength at the frequency of the first to-be-rectified wave, and the second capacitor has the first end connected to the second end of the second transmission line, and the second end of the second capacitor is grounded, so that the third to-be-rectified wave is short-circuited.

2. The high frequency rectifier according to claim 1, wherein an in-phase divider is used as the power divider, and a phase of the second to-be-rectified wave output from the power divider and a phase of the third to-be-rectified wave output from the power divider are the same.

3. The high frequency rectifier according to claim 1, wherein a 90-degree divider is used as the power divider, and a phase difference between the second to-be-rectified wave output from the power divider and the third to-be-rectified wave output from the power divider is 90 degrees.

4. The high frequency rectifier according to claim 1, wherein a 180-degree divider is used as the power divider, and a phase difference between the second to-be-rectified wave output from the power divider and the third to-be-rectified wave output from the power divider is 180 degrees.

* * * * *